United States Patent
Meador

(10) Patent No.: US 6,593,389 B1
(45) Date of Patent: Jul. 15, 2003

(54) POLYIMIDES BY PHOTOCHEMICAL CYCLOPOLYMERIZATION

(75) Inventor: Michael A. Meador, Strongsville, OH (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 96 days.

(21) Appl. No.: 09/827,140

(22) Filed: Apr. 5, 2001

(51) Int. Cl.$^7$ .............. C08F 2/46; C08G 73/12
(52) U.S. Cl. .............. 522/36; 522/63; 522/167; 522/178; 522/180; 522/181; 522/183; 526/316; 528/220; 528/228
(58) Field of Search .............. 522/167, 63, 36, 522/37, 178, 180, 181, 182, 183; 528/228, 220; 526/316

(56) References Cited

U.S. PATENT DOCUMENTS

| | | | | |
|---|---|---|---|---|
| 4,070,259 A | * | 1/1978 | De Poortere et al. | 522/103 |
| 6,034,150 A | * | 3/2000 | Hoyle et al. | 522/63 |
| 6,140,385 A | | 10/2000 | Bowers et al. | 522/37 |
| 6,153,662 A | * | 11/2000 | Miller et al. | 522/63 |
| 6,274,699 B1 | * | 8/2001 | Meador | 528/353 |
| 6,486,230 B1 | * | 11/2002 | Meador | 522/180 |

OTHER PUBLICATIONS

Macromolecules vol. 29, No. 27, pp. 8983–8986, 1996.
Ultraviolet Curing of Polymers, NASA Tech Briefs, Mar. 1999.
NASA News, Sampe Jour. vol. 36, No. 5, Sep. 2000.

* cited by examiner

Primary Examiner—Susan W. Berman
(74) Attorney, Agent, or Firm—Kent N. Stone

(57) ABSTRACT

The polyimides of this invention are derived from a Diels-Alder cyclopolymerization of a photochemically generated bisdiene with dienophiles, such as bismaleimides, trismaleimides and mixtures thereof with maleimide end-caps. Irradiation of one or more diketones produces two distinct hydroxy o-quinodimethane (photoenol) intermediates. These intermediates are trapped via a Diels-Alder cycloaddition with appropriate dienophiles, e.g., bismaleimide and/or trismaleimides to give the corresponding polyimides in quantitative yields. When bismaleimides, trismaleimides or mixtures thereof with maleimide end-caps are used as the dienophile, the resulting polyimides have glass transition temperatures (Tg) as high as 300° C. Polyimide films can be prepared by ultraviolet irradiation of high solids content varnishes of the monomers in a small amount of solvent, e.g., cyclohexanone, dimethyl formamide, N-methylpyrollidone and the like. These polyimides are characterized as having high glass transition temperatures, good mechanical properties and improved processing in the manufacture of adhesives, electronic materials and films.

33 Claims, No Drawings

POLYIMIDES BY PHOTOCHEMICAL CYCLOPOLYMERIZATION

ORIGIN OF THE INVENTION

The invention described herein was made by an employee of the United States Government and may be manufactured and used by or for the Government for governmental purposes without the payment of any royalties thereon or therefore.

BACKGROUND OF THE INVENTION

1. Field of the Invention

Polymers having high-temperature characteristics are required to improve the performance and to reduce the weight of industrial materials in electronic devices, aeronautical equipment and some machinery. The polyimides and polyacrylates are polymers known to have the required mechanical strength, dimensional stability, low coefficient of thermal expansion, and electrical insulation properties in addition to high-temperature resistance.

The preparation of high performance polymers, however, requires cure temperatures in excess of 200° C. This leads to high tooling costs, high processing costs, and processing induced thermal stresses that can compromise component durability. The process of this invention allows the curing of high performance polyimides and polyacrylates at or near room temperature. This invention enables the cure of high performance polyimides and polyacrylates at or near room temperature by using ultraviolet light or some other radiation sources, such as electron beams rather than heat to provide the cure energy. Specifically, this invention relates to the Diels-Alder cyclopolymerization of a photochemically generated diene with a dienophile, such as bismaleimide and mixtures thereof with a maleimide end-cap and trismaleimide. Irradiation of an aromatic diketone produces two distinct hydroxy o-quinodimethane (photoenol) intermediates. The intermediates are trapped via a Diels-Alder cycloaddition with appropriate dienophiles, e.g., bismaleimide and/or trismaleimide to give the corresponding polyimides in quantitative yields. When maleimides such as bismaleimide and/or trismaleimide are used as the bisdienophile, the resulting polyimides of this invention have glass transition temperatures, (Tg), as high as 300° C.

2. Description of the Prior Art

High performance polymers such as polyimides or polyesters are typically prepared by condensation reactions. In the case of polyimides, the reaction involves diamines and dianhydrides or dianhydride derivatives e.g., the diester of tetracarboxylic acids. This process suffers from several problems in that aromatic diamines are toxic, mutagenic, or carcinogenic. Safe handling and disposal of these materials requires the implementation of costly engineering controls. Further, processing of condensation reaction systems also can be a problem since this chemistry leads to low molecular weight by-products, e.g., water and alcohols. Evolution of these by-products and high processing temperatures lead to voids and defects in the polymer and composites prepared with these polymers.

It is known that some of these processing problems can be overcome, however, by combining addition chemistry with condensation chemistry, as is the case for PMR-15 polyimides. With this approach, low molecular weight oligomers (short chain polymers) are prepared by the condensation of diamines with dianhydrides or its derivatives and a suitable endcapping group. The endcaps undergo a cross-linking reaction at high temperatures (typically in excess of 300° C.) to provide a polymer network having good solvent resistance and high temperature performance. Prior to cross-linking, however, the imide oligomers are somewhat fluid, and volatile condensation by-products can be removed from the polymer. While this approach overcomes some of the processing difficulties, it requires higher processing temperatures and monomer toxicity is still a concern.

It is known also in the prior art that the Diels-Alder polymerization reaction has been used to prepare high performance polymers such as the polyimides and polyesters. Typical Diels-Alder reactions used to obtain polyimides have involved the reaction of bismaleimides with a suitable bisdiene such as a bisfuran. Other Diels-Alder reactions use a bisdiene precursor, such as bis(benzocyclobutane), to form the bisdiene upon heating to temperatures of 250° C. or higher. Using these Diels-Alder cyclopolymerization reactions overcome the health and safety problems associated with other methods of preparing polyimides, since these reactions do not involve the use of aromatic amines as one of the reactants. However, these methods still require high cure and processing temperatures; see, for example, U.S. Pat. Nos. 5,338,827; 5,322,924; 4,739,030 and the Annual Reviews in Materials Science, 1998, 28, 599–630 by M. A. Meador.

SUMMARY OF THE INVENTION

The unique feature of this invention is that it employs energy from ultraviolet light, rather than heat to form the polymers. While other radiation curable polymers have been developed, these methods employ either free radical or cationic-based polymerization chemistries. The present invention utilizes photochemically generated dienes (not free radicals or carbocations) and standard Diels-Alder cycloaddition chemistry in the polymerization process.

More specifically, this invention relates to polyimides and to the method of preparing polyimides derived from the photochemical cyclopolymerization of stoichiometric amounts of at least one aromatic diketone selected from the group consisting of:

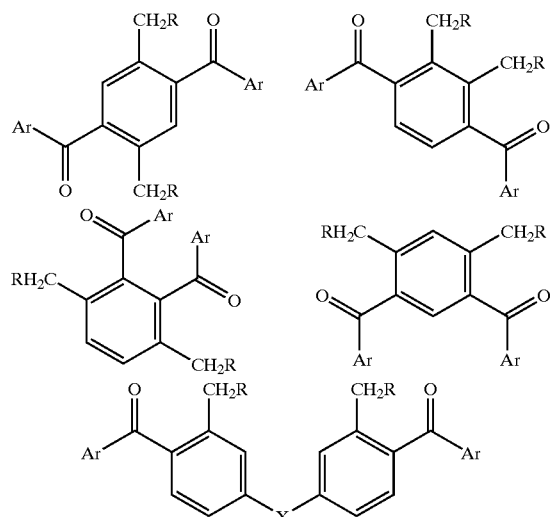

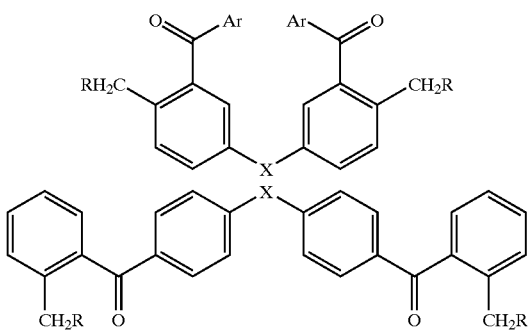

wherein Ar is the same or a different aromatic or substituted aromatic radical e.g., p-methoxy phenyl, p-tolyl, p-cyanophenyl, and R is the same or a different radical selected from the group consisting of aromatic radicals, substituted aromatic radicals, lower alkyl radicals of 1 to 8 carbons, $O_2CR_1$ and $R_2$ radicals where $R_1$ and $R_2$ are the same or different organic radicals selected from the group consisting of lower alkyl radicals of 1 to 8 carbons e.g. 1 to 4 carbons, aryl and substituted aryl radicals, and x in the diketone formula is selected from the group consisting of nil, oxygen, sulfur, —C=O, —CH$_2$, alkyl radicals of 1 to 8 carbons, ether radicals, ester radicals, aryl radicals and substituted aryl radicals with at least one dienophile selected from the group consisting of bismaleimide, trismaleimide and mixtures of a maleimide end-cap with bismaleimide and/or trismaleimide in various molar ratios to obtain polyimides having glass transition temperatures (Tg) as high as 300° C., high thermal-oxidative stability and decomposition-stability temperatures ranging up to about 350° C.

Accordingly, it is an object of this invention to employ energy from ultraviolet light rather than heat to obtain polyimides having glass transition temperatures as high as 300° C.

It is another object of this invention to provide a novel method of preparing polyimides at ambient temperatures by using radiant energy to photochemically cyclopolymerize aromatic diketones and one or more dienophile.

It is another object of this invention to provide a method of preparing radiation curable polyimides that do not have the health risk associated with conventional methods that utilize toxic aromatic diamines.

It is a further object of this invention to provide polyimides, and a novel process of preparing cured polyimides by using radiation energy at ambient temperatures to polymerize at least one aromatic diketone and a dienophile without using free radical or cationic polymerization methods.

These and other objects of this invention will become apparent from a further and more detailed description of the invention as follows:

DESCRIPTION OF THE PREFERRED EMBODIMENTS

This invention enables the curing of high performance polymers at or near room temperature by using ultraviolet light (or some other radiation sources, such as electron beams) rather than heat to provide the cure energy. In general, the invention involves the Diels-Alder cyclopolymerization of photochemically generated bisdienes with dienophiles, such as bismaleimides. The general chemistry is described in Scheme 1, for a representative polyimide. The irradiation of an aromatic diketone produces two distinct hydroxy o-quinodimethane (photoenol) intermediates. These intermediates are trapped via a Diels-Alder cycloaddition with appropriate dienophiles, e.g., bismaleimide, added prior to irradiation, to give the corresponding polymers in quantitative yields. For example, when bismaleimides are used as the bisdienophile, the resulting polyimides have glass transition temperatures, (Tg) as high as 300° C. depending upon the structures of the diketone and the bismaleimide. More important, recent work has demonstrated that polyimide films can be prepared by ultra-violet radiation of high solids content varnishes of the appropriate monomers in a small amount of solvent, e.g. cyclohexanone, dimethyl formamide, N-methylpyrollidone and the like.

The general chemistry for the preparation of either polyesters or polyimides from Diels-Alder trapping of photochemically generated bisdiene intermediates is shown (Scheme1) as follows:

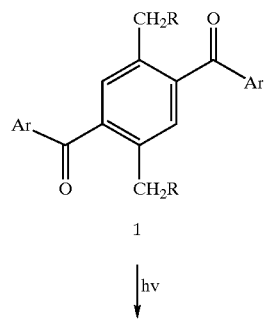

1

↓ hv

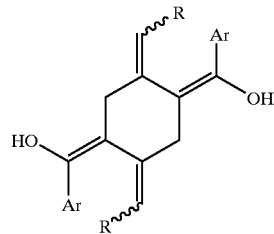

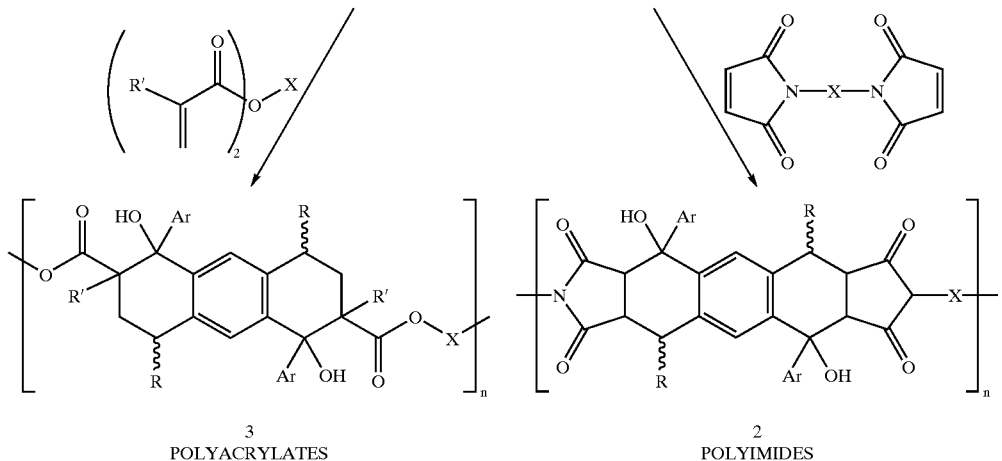

3
POLYACRYLATES

2
POLYIMIDES

For purpose of this invention, the other diketones that can be used in preparing the polyimides (as in Scheme 1) include the following seven diketones:

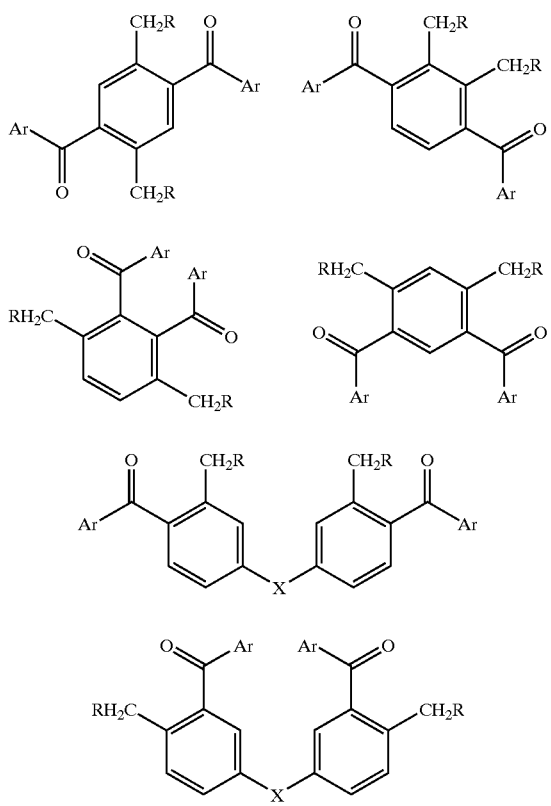

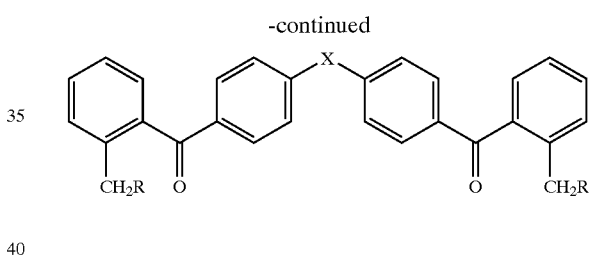

wherein Ar is the same or a different aromatic or substituted aromatic radical e.g. p-methoxy phenyl, p-tolyl p-cyanophenyl, and R is the same or a different radical selected from the group consisting of aromatic radicals, substituted aromatic radicals, lower alkyl radicals of 1 to 8 carbons, $O_2CR_1$ and $-OR_2$ radicals wherein $R_1$ and $R_2$ are the same or different radicals selected from the group consisting of lower alkyl radicals of 1 to 8 carbons, e.g. 1 to 4 carbons, aryl and substituted aryl radicals, and X in the diketone formulae is selected from the group consisting of nil, oxygen, sulfur, $-C=O$, $-CH_2$, primary, secondary or tertiary alkyl radicals of 1 to 8 carbons, aryl or aromatic radicals, substituted aromatic radicals, primary, secondary or tertiary ethers, poly(ethers), ester radicals, and poly(aryls), having the formula:

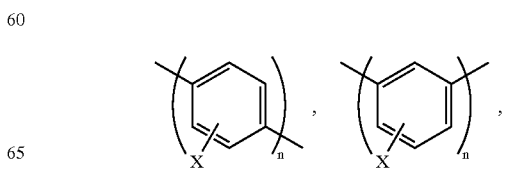

-continued

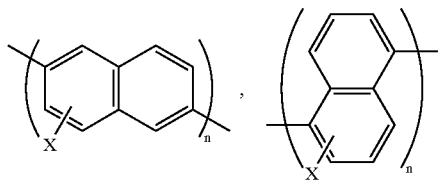

wherein n has the value of 1 or 2, and X in the poly(aryl) formulae is a lower alkyl substitutent or nil.

In-addition to bismaleimides, the trismaleimides can be used as the dienophiles either alone or as mixtures with a maleimide end-cap and/or with bismaleimides as a mixture in stoichiometric molar ratios. Structures of these trisdienophiles include, for example:

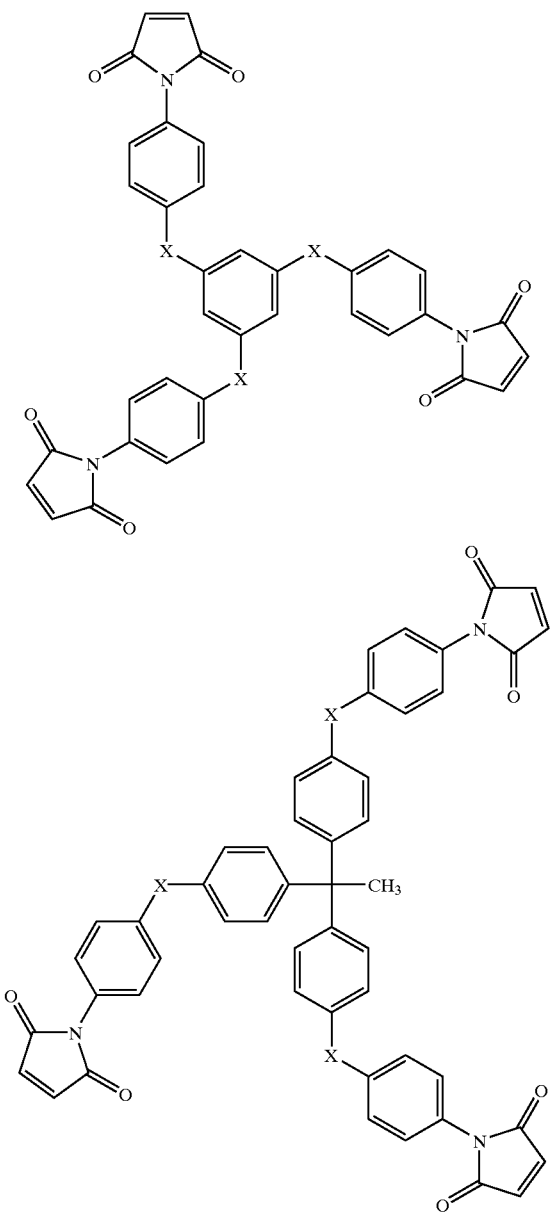

wherein X in the trismaleimide formulae is selected from the group consisting of nil, oxygen, $CH_2$, and —C=O.

More specifically, the polyimides of this invention are derived from the photochemical cyclopolymerization at ambient temperatures of approximately stoichiometric amounts of at least one (a) aromatic diketone selected from the group consisting of:

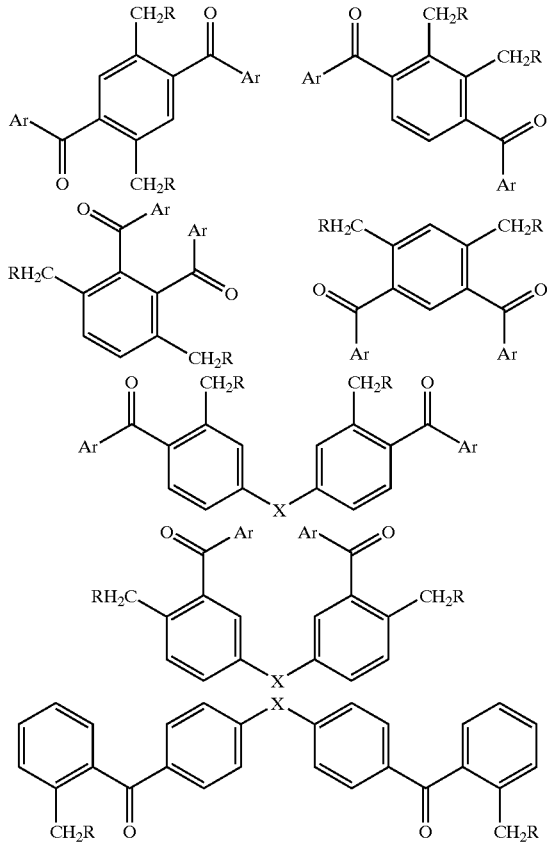

wherein Ar is the same or a different aromatic or substituted aromatic radical e.g. lower alkyl substitutents and R is the same or a different radical selected from the group consisting of aromatic radicals, e.g. substituted aromatic radicals, lower alkyl radicals of 1 to 8 carbons, $O_2CR_1$ and —$OR_2$ radicals wherein $R_1$ and $R_2$ are the same or different radicals selected from the group consisting of lower alkyl radicals of 1 to 8 carbons e.g. 1 to 4 carbons and aryl and substituted aryl radicals, and X in the diketone formulae is selected from the group consisting of nil, oxygen, sulfur, —C=O, —$CH_2$, alkyl radicals of 1 to 8 carbons, ether or poly(ether) radicals, ester radicals, and aryl or poly(aryl) radicals with at least one (b) dienophile selected from the group consisting of bismaleimides, trismaleimides and mixtures of maleimide with bismaleimides and/or trismaleimides in effective molecular or equivalent ratios i.e. 0 to about 25 molar percent of the endcap maleimide with bismaleimides and/or trismaleimides to obtain polyimides having glass transition temperatures (Tg) ranging up to about 300° C., high thermal-oxidative stability and decomposition-stability temperatures ranging up to about 350° C.

More specifically, the polyimides of this invention are derived, preferably, by a process of photochemically cyclopolymerizing with ultra-violet light at ambient temperatures approximately stoichiometric amounts of an (a) aromatic diketone having the formula:

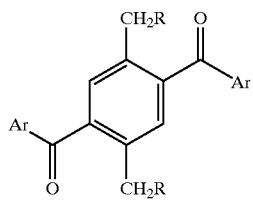

wherein Ar is the same or a different aromatic or substituted aromatic radical and R is the same or different radical selected from the group consisting or aromatic radicals, lower alkyl radicals of 1 to 8 carbons, $O_2CR_1$ and $—OR_2$ radicals wherein $R_1$ and $R_2$ are the same or different radicals selected from the group consisting of lower alkyl radicals of 1 to 8 carbons, and aryl radicals, and (b) at least one bis(maleimide) selected from the group consisting of:

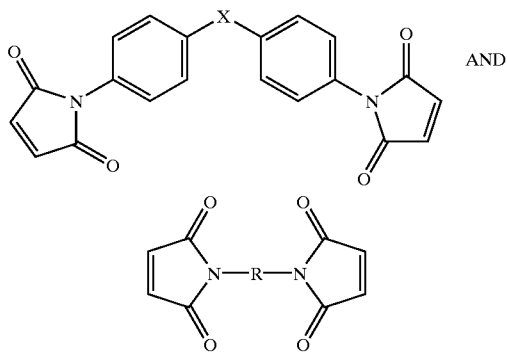

wherein X in the above bis(maleimide) formula is selected from the group consisting of oxygen, C=O, $SO_2$, $CH_2$, nil, ether radicals, poly(ether) radicals, ester radicals, polyester radicals, aromatic and poly(aromatic) radicals, and R is selected from the group consisting of alkyl(primary, secondary, or tertiary) radicals, ether radicals, poly(ether) radicals, ester radicals, and poly(ester radicals).

The following examples illustrate the novel process of obtaining either polyimides or polyacrylates by photochemically cyclopolymerizing diketones and dienophiles at ambient temperatures.

EXAMPLE 1

A benzene solution containing an equimolar amount of 4,4'-bis(2-methylbenzoyl)diphenyl ether and 4,4'-bismaleimido diphenylmethane was degassed under nitrogen for 1 hour. The resulting stirred solution was irradiated under a nitrogen atmosphere for 18 hours using ultraviolet light from a 250 Watt medium pressure Mercury vapor lamp filtered through Pyrex. The solvent was removed under vacuum and the resulting residue triturated with methanol and filtered to afford polyimide (100% yield).

Infrared analysis (KBr pellet) showed the absence of the diketone carbonyl at $1655 cm^{-1}$ indicating complete reaction of the diketone and the presence of imide carbonyl peaks at 1711 and $1778 cm^{-1}$ confirming formation of the desired polyimide. Thermal analysis of the polyimide shows a Tg of 184° C. (measured by Differential Scanning Calorimetry) and an onset of decomposition, Td, of 321° C. (measured by Thermal Gravimetric Analysis).

EXAMPLE 2

A 10 wt % solution of an equimolar amount of 2,5-ibenzoyl-1,4-dimethylbenzene and the bismaleimide of Bis-aniline-P in cyclohexanone was placed in a Petri Dish. The solvent was allowed to evaporate in a fume hood and the resulting gummy film was placed in a sealed chamber fitted with a quartz window and degassed with argon for about 2 minutes. The chamber was placed on the conveyor belt of a thin film uv curing apparatus and irradiated for a total of 20 passes (approximately 20 minute exposure time) using light from a broad spectrum ultraviolet-visible lamp (irradiation spectrum ranged from 200 to 580 nm, with a maximum at 360 nm). The Petri dish was removed from the sample chamber and heated overnight (approximately 18 hours) in a vacuum oven at 80° C. to remove any residual solvent.

Infrared analysis (NaCl plates) of the resulting film showed no benzophenone carbonyl at $1655 cm^{-1}$ indicating complete reaction of the diketone and the presence of imide carbonyl peaks at 1778 and 1711 cm–1 confirming formation of polyimide. Thermal analysis of this film showed at Tg at 170° C. (measured by Differential Scanning Calorimetry) and an onset of decomposition at 220° C. (measured by Thermal Gravimetric Analysis).

EXAMPLE 3

A benzene solution containing an equimolar amount of 2,5-dibenzoyl-1,4dimethylbenzene and 1,4butanediol diacrylate was degassed under nitrogen for 1 hour. The resulting stirred solution was then irradiated under a nitrogen atmosphere for 18 hours using ultraviolet light from a 250 Watt medium pressure Mercury vapor lamp filtered through Pyrex. The solvent was removed under vacuum and the resulting residue triturated with methanol and filtered to afford the corresponding polyester (100% yield).

Infrared analysis (KBr pellet) shows the absence of the diketone carbonyl at $1655 cm^{-1}$ indicating complete reaction of the diketone and the presence of an ester carbonyl absorption at $1750 cm^{-1}$ confirming formation of the desired polyester. Thermal analysis of the polyester shows a Tg of 160° C. (measured by Thermal Mechanical Analysis) and an onset of decomposition, Td, of 308° C. (measured by Thermal Gravimetric Analysis).

EXAMPLE 4

A 10 wt % cyclohexanone solution of 2,5-dibenzoyl-1,4-dimethylbenzene and a mixture of pentaerythritol propoxylate triacrylate and 1,6-hexanediol ethoxylate diacrylate in the proper stoichiometry was placed in a Petri Dish. The solvent was allowed to evaporate in a fume hood and the resulting gummy film was placed in a sealed chamber fitted with a quartz window and degassed with argon for about 2 minutes. The chamber was placed on the conveyor belt of a thin film uv curing apparatus and irradiated for a total of 20 passes (approximately 20 minute exposure time) using light from a broad spectrum ultraviolet-visible lamp (irradiation spectrum ranged from 200 to 580 nm, with a maximum at 360 nm). The Petri dish was removed from the sample chamber and heated overnight (approximately 18 hours) in a vacuum oven at 80° C. to remove any residual solvent.

Infrared analysis (NaCl plates) of the resulting film showed no benzophenone carbonyl at $1655 cm^{-1}$ indicating complete reaction of the diketone and the presence of an ester carbonyl at about $1750 cm^{-1}$ confirming formation of the polyester. Thermal analysis of this film showed at Tg at 50° C. (measured by Differential Scanning Calorimetry) and an onset of decomposition at 210° C. (measured by Thermal Gravimetric Analysis).

The ultraviolet-curing process of this invention offers several advantages over other known processes for the preparation of polyimides and polyesters. Ultraviolet cured films, for example, undergo less shrinkage during cure in comparison to films that are cured at high temperatures. Moreover, this process is particularly useful for curing polyimides and polyesters that contain thermally sensitive organic groups or additives as nonlinear optical materials. In addition, this process does not entail some of the disadvantages of the condensation-chemistry-process; namely, the formation of volatiles during cure, health risks associated with aromatic diamines, and poor solution stability. Specifically, the polyimides and polyesters of this invention are characterized as having high glass transition temperatures, good mechanical properties and improved processing in the manufacture of adhesives, films and electronic materials. The polyimides and polyacrylates are particularly useful in preparing fiber reinforced composites used as the preferred structural materials in military and civil applications such as jet engine cowls, ducts and the like because of their light-weight, load-bearing characteristics and their oxidative stability at high temperatures.

While this invention has been described by a number of specific examples, it is obvious that there are other variation and modification that can be made without departing from the spirit and scope of the invention as set forth in the appended claims.

What is claimed is:

1. Polyimides derived from the photochemical cyclopolymerization of approximately stoichiometric amounts of at least one
   (a) aromatic diketone selected from the group consisting of

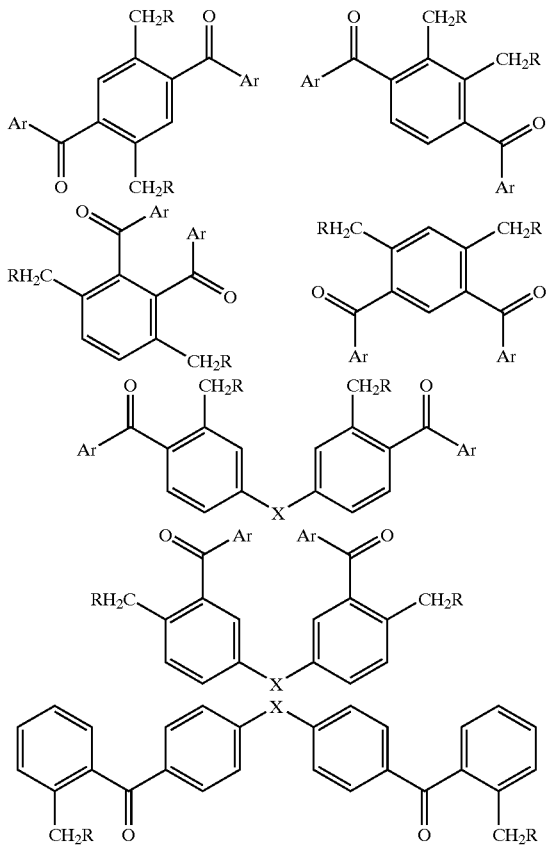

wherein Ar is the same or a different aromatic or substituted aromatic radical and R is the same or a different radical selected from the group consisting of aromatic radicals, $O_2CR_1$ and $-OR_2$ radicals wherein $R_1$ and $R_2$ are the same or different radicals selected from the group consisting of lower alkyl radicals of 1 to 8 carbons and aryl radicals, and X is selected from the group consisting of nil, oxygen, sulfur, C=O, alkyl radicals of 1 to 8 carbons, ether radicals, ester radicals, and aryl radicals with at least one
   (b) dienophile selected from the group consisting of bismaleimides, trismaleimides and mixtures of maleimide endcap with bismaleimide and/or trismaleimides, wherein the maleimides range from 0 to about 25 molar percent of the mixture, to obtain polyimides having glass transition temperatures (Tg) ranging up to about 300° C., high thermal-oxidative stability and decomposition-stability temperatures ranging up to about 350° C.

2. The polyimides of claim 1 wherein the diketones and the dienophiles are photochemical cyclopolymerized with ultraviolet light at wavelengths above 200 nm.

3. The polyimides of claim 1 wherein the dienophiles are trismaleimides.

4. The polyimides of claim 1 wherein the dienophiles are bismaleimides.

5. The polyimides of claim 1 wherein the dienophile is a mixture of bismaleimides, trismaleimides and maleimides.

6. The polyimides of claim 1 wherein the dienophile is a mixture of bismaleimides and maleimides.

7. The polyimides of claim 1 wherein the dienophile is a mixture of trismaleimides and maleimides.

8. The polyimides of claim 1 wherein the dienophile is a mixture of bismaleimides and trismaleimides.

9. The polyimide of claim 1 wherein R is the radical $O_2CR_1$.

10. The polyimide of claim 1 wherein R is $-OR_2$.

11. The polyimide of claim 1 wherein $R_1$ is an aryl radical.

12. The polyimide of claim 1 wherein $R_2$ is a lower alkyl radical.

13. The polyimide of claim 1 wherein $R_2$ is an aryl radical.

14. The polyimide of claim 1 wherein X is an aryl radical.

15. The polyimides of claim 1 wherein X is the radical —C=O.

16. The polyimides of claim 1 wherein X is oxygen.

17. The polyimides of claim 1 wherein X is an ether radical.

18. The polyimides of claim 1 wherein X is an alkyl radical of 1 to 8 carbons.

19. A process of preparing polylmides by photochemically cyclopolymerizing at ambient temperatures approximately stoichiometric amounts of at least one
   (a) aromatic diketone selected from the group consisting of

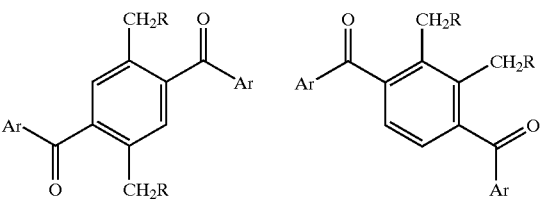

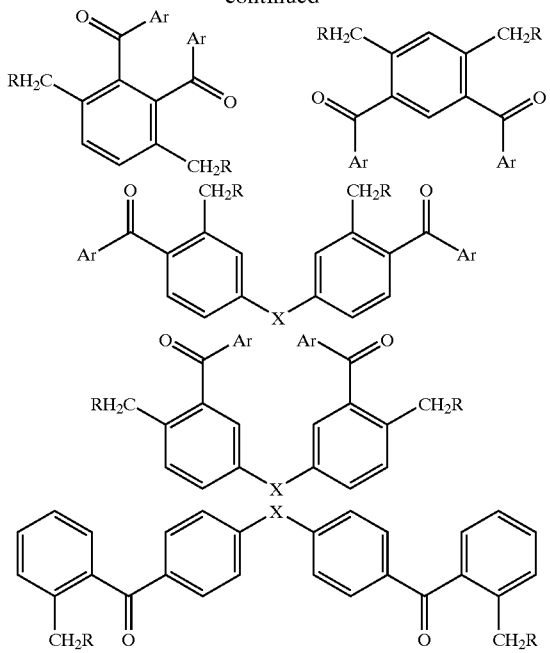

wherein Ar is the same or a different aromatic or substituted aromatic radical and R is the same or a different radical selected from the group consisting of aromatic radicals, $O_2CR$, and —OR2 radicals wherein $R_1$ and $R_2$ are the same or different radicals selected from the group consisting of lower alkyl radicals of 1 to 8 carbons, and aryl radicals, and X is selected from the group consisting of nil, oxygen, sulfur, —C=O, alkyl radicals of 1 to 8 carbons, ether radicals, ester radicals, and aryl radicals with at least one (b) dienophile selected from the group consisting of bismaleimides, trismaleimides, and mixtures of maleimide end cap with bismaleimides, and/or trismaleimides wherein the maleimide ranges from 0 to about 25 molar percent of the mixture, to obtain polyimides having glass transition temperatures (Tg) ranging up to about 300° C., high thermal oxidative stability and decomposition-stability temperatures ranging up to about 350°.

20. The process of claim 19 wherein the dienophiles are trismaleimides.

21. The process of claim 19 wherein the dienophiles are bismaleimides.

22. The process of claim 19 wherein the dienophile is a mixture of bismaleimides, trismaleimides and maleimides, and the diketone has the formula:

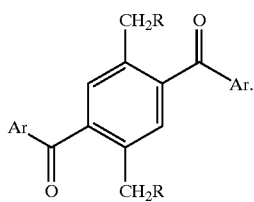

23. The process of claim 19 wherein the R radicals are different.

24. The process of claim 19 wherein R is an aromatic radical.

25. The process of claim 19 wherein R is —$OR_2$.

26. The process of claim 19 wherein R is $O_2CR_1$.

27. The process of claim 19 wherein $R_2$ is a lower alkyl radical of 1 to 8 carbons.

28. The process of claim 14 wherein $R_1$ is an aryl radical.

29. Polyimides derived from the photochemical cyclopolymerization of approximately stoichiometric amounts of at least one (a) aromatic diketone selected from the group consisting of

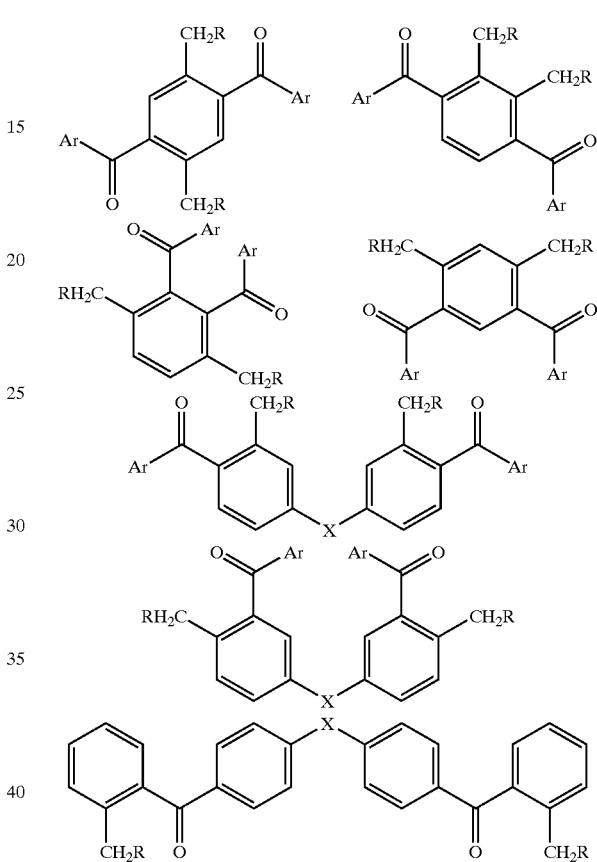

wherein Ar is the same or a different aromatic or substituted aromatic radical and R is the same or a different radical selected from the group consisting of aromatic radicals, $O_2CR_1$ and $R_2$ radicals wherein $R_1$ and $R_2$ are the same or different radicals selected from the group consisting of lower alkyl radicals of 1 to 8 carbons, and aryl radicals, and X is selected from the group consisting of nil, oxygen, sulfur, —C=O, alkyl radicals of 1 to 8 carbons, ether radicals, ester radicals and aryl radicals with at least one (b) bismaleimide selected from the group consisting of:

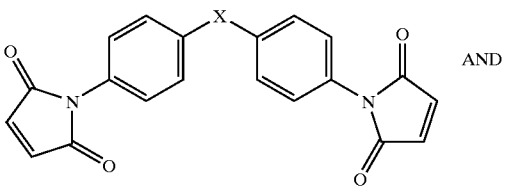
AND

-continued

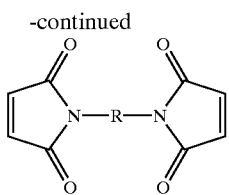

wherein X in the bismaleimide formula is selected from the group consisting of oxygen, C=O, $SO_2$ $CH_2$, nil, ether radicals, poly(ether) radicals, ester radicals, polyester radicals, aromatic and poly(aromatic) radicals, and R in the bismaleimide formula is selected from the group consisting of alkyl (primary, secondary, or tertiary) radicals, ether radicals, poly(ether) radicals, ester radicals, and poly(ester) radicals to obtain polyimides having glass transition temperatures (Tg) ranging up to about 300° C., high thermal-oxidative stability and decomposition stability temperatures as high as 350° C.

30. The polyimides of claim 29 wherein the diketone has the formula:

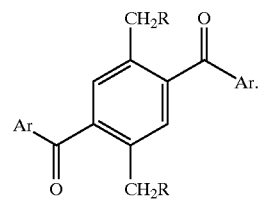

31. The polyimide of claim 30 wherein R is the radical $O_2CR_1$.

32. The polyimide of claim 30 wherein R is the radical $-OR_2$.

33. The polyimide of claim 30 wherein R is an aromatic radical.

* * * * *